(12) United States Patent
Matsushita et al.

(10) Patent No.: US 10,334,647 B2
(45) Date of Patent: Jun. 25, 2019

(54) CONNECTION METHOD, CONNECTION SYSTEM, PORTABLE TERMINAL, AND PROGRAM

(71) Applicant: Panasonic Intellectual Property Management Co., Ltd., Osaka (JP)

(72) Inventors: Yosuke Matsushita, Osaka (JP); Kunio Gobara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 15/392,976

(22) Filed: Dec. 28, 2016

(65) Prior Publication Data

US 2017/0111948 A1    Apr. 20, 2017

Related U.S. Application Data

(63) Continuation of application No. PCT/JP2015/004717, filed on Sep. 16, 2015.

(30) Foreign Application Priority Data

Sep. 19, 2014    (JP) .................................. 2014-191897

(51) Int. Cl.
*H04W 4/00* (2018.01)
*H04W 76/14* (2018.01)
*H04L 12/46* (2006.01)
*H04L 12/66* (2006.01)
(Continued)

(52) U.S. Cl.
CPC ......... *H04W 76/14* (2018.02); *H04L 12/2818* (2013.01); *H04L 12/2834* (2013.01);
(Continued)

(58) Field of Classification Search
CPC .... H04W 76/14; H04W 76/19; H04L 61/2007
See application file for complete search history.

(56) References Cited

U.S. PATENT DOCUMENTS

2007/0288606 A1    12/2007    Kito et al.
2013/0086644 A1*   4/2013    Bahn .................. H04L 12/2818
                                                        726/4
(Continued)

FOREIGN PATENT DOCUMENTS

JP    2001-077855    3/2001
JP    2004-194016    7/2004
(Continued)

OTHER PUBLICATIONS

International Search Report of PCT application No. PCT/JP2015/004717 dated Dec. 15, 2015.
(Continued)

*Primary Examiner* — Chi H Pham
*Assistant Examiner* — Fahmida S Chowdhury
(74) *Attorney, Agent, or Firm* — McDermott Will & Emery LLP

(57) ABSTRACT

A connection method is a connection method for a case where a terminal inside home is connected to a router inside home connected to a first network. This connection method includes: an acquisition step of acquiring, by a portable terminal, connection information used for connection for the portable terminal to make direct communication with the terminal inside home from a support server connected to the first network; and a storage step of storing the connection information acquired in the acquisition step in the portable terminal. The connection information includes an IP address and port number which are set in the router inside home to correspond to the terminal inside home.

8 Claims, 9 Drawing Sheets

(51) Int. Cl.
    *H04W 76/19*     (2018.01)
    *H04L 29/12*     (2006.01)
    *H04L 29/08*     (2006.01)
    *H04W 36/14*     (2009.01)
    *H04L 12/28*     (2006.01)
    *H04L 12/64*     (2006.01)
    *H04L 29/06*     (2006.01)
    *H04W 48/18*     (2009.01)
    *H04W 40/02*     (2009.01)

(52) U.S. Cl.
    CPC .......... *H04L 12/46* (2013.01); *H04L 12/6418* (2013.01); *H04L 12/66* (2013.01); *H04L 61/2007* (2013.01); *H04L 61/2514* (2013.01); *H04L 61/2517* (2013.01); *H04L 63/029* (2013.01); *H04L 63/061* (2013.01); *H04L 67/104* (2013.01); *H04W 36/14* (2013.01); *H04W 48/18* (2013.01); *H04W 76/19* (2018.02); *H04L 61/2553* (2013.01); *H04L 61/2575* (2013.01); *H04W 40/02* (2013.01)

(56) References Cited

U.S. PATENT DOCUMENTS

2014/0040435 A1*   2/2014   Ylimartimo ........ H04L 12/2818
                                                                                                709/219
2014/0156788 A1*   6/2014   Lewis .................... H04L 12/00
                                                                                                709/217

FOREIGN PATENT DOCUMENTS

JP         2006-108899         4/2006
JP         2007-166116         6/2007

OTHER PUBLICATIONS

J. Rosenberg et al., "STUN-Simple Traversal of User Datagram Protocol (UDP) Through Network Address Translators (NATs)", RFC3489, Mar. 2003.

Internet Gateway Device (IGD) V 1.0, Nov. 12, 2001, <http://upnp.org/specs/gw/i>.

The Extended European Search Report dated May 31, 2017 for the related European Patent Application No. 15841423.5.

J. Salowey, H. Zhou, Cisco Systems, P. Eronen, Nokia, H. Tschofenig, Nokia Siemens Networks, "Transport Layer Security (TLS) Session Resumption without Server-Side State; rfc5077.txt", Network Working Group RFC 1717, Internet Society (ISOC) 4, Rue Des Falaises CH-1205 Geneva, Switzerland, Ch, Jan. 1, 2008 (Jan. 1, 2008), XP015055149.

T. Dierks: "RFC 5246—The Transport Layer Security (TLS) Protocol Version 1.2", Aug. 31, 2008 (Aug. 31, 2008), XP055270691, Retrieved from the Internet: URL: https://tools.ietf.org/html/rfc5246 [retrieved on May 4, 2016].

\* cited by examiner

CONNECTION METHOD, CONNECTION SYSTEM, PORTABLE TERMINAL, AND PROGRAM

TECHNICAL FIELD

The present disclosure relates to a connection method, a connection system, and a portable terminal for making direct communication on an equal footing with each other.

BACKGROUND ART

PTL 1 discloses a technique to reduce time required for resuming point to point protocol (PPP) connection by storing in a client an Internet protocol (IP) address when PPP connection is made last time.

NPL1 and NPL2 disclose a technique for making communication over network address translation (NAT).

NAT refers to a technique that enables a plurality of terminals in a local area network (LAN) to communicate with one global Internet protocol (IP) address. Specifically, NAT refers to a technique to represent different local addresses as different port numbers under an identical global address when a plurality of terminals within LAN inside home connect with a network outside LAN by a router performing identification or translation between IP addresses and port numbers.

Examples of the technique to make communication over NAT include a user datagram protocol (UDP) hole punching method and a method using universal plug and play (UPnP).

The UDP hole punching method is a method using simple traversal of user datagram protocol through NATs (STUN), etc. (for example, NPL1). Specifically, the UDP hole punching method is a method for connecting a server that provides services (for example, moving image server) to a router, and notifying a combination of an IP address and port number which can be accessed from outside and which are set in the router to a terminal that is a partner of peer to peer (P2P) connection (hereinafter referred to as "P2P partner terminal" or just "partner terminal"). The P2P partner terminal attempts access to the server by using the combination. This method is applicable to a router of an NAT method called Full-Cone NAT.

The method using UPnP is a method for a terminal within LAN (for example, moving image server) to set in the router a combination of an IP address and port number which are disclosed to outside, to notify set information to the P2P partner terminal, and then the P2P partner terminal attempts direct communication with the server by using the information. This method is applicable to a router in conformity with universal plug and play-Internet gateway device (UPnP-IGD) (for example, NPL2).

Both of the methods are methods for notifying the combination of the IP address and port number which are set in the router to the P2P partner terminal, and then the P2P partner terminal attempts direct communication with the server based on the information.

CITATION LIST

Patent Literature

PTL 1: Unexamined Japanese Patent Publication No. 2001-77855 Non-Patent Literatures
NPL1: STUN-Simple Traversal of User Datagram Protocol (UDP) Through Network Address Translators (NATs) RFC3489

NPL2: Internet Gateway Device (IGD) V 1.0 (http://upnp.org/specs/gw/igd1/)

SUMMARY

The connection method according to the present disclosure is a connection method for a portable terminal outside home to make direct communication with a terminal inside home on an equal footing. This connection method is a connection method for a case where the terminal inside home is connected to a router inside home connected to a first network. The connection method includes: an acquisition step of acquiring, by the portable terminal from a support server connected to the first network, connection information used for connection for the portable terminal to make direct communication with the terminal inside home; and a storage step of storing the connection information acquired in the acquisition step in the portable terminal. The connection information includes an Internet protocol (IP) address and port number which are set in the router inside home to correspond to the terminal inside home.

DESCRIPTION OF EMBODIMENTS (Underlying Knowledge Forming Basis of the Present Disclosure)

Hereinafter, underlying knowledge forming a basis of the present disclosure will be described.

In recent years, audiovisual (AV) devices connectable to a network inside home are widely used. Following this, a function to allow AV devices to cooperate with each other via the network inside home is proposed. For example, a moving image streaming function inside home using a digital living network alliance (DLNA) technique is proposed. Using this technique allows any client terminal connected to the network to view a program recorded in any AV device inside home from any room inside home.

In addition, because of widespread use of a DTCP: digital transmission content protection (DTCP+) method, a growing number of users are expected to access broadcast content, etc. stored in a terminal inside home by using a portable terminal, such as a smartphone and a tablet, outside home.

In order to access the terminal inside home from the portable terminal, it is possible to use an already used peer-to-peer (P2P) connection technique as a communication technique. However, in the following two use cases, conventional P2P connection techniques may require time for resuming P2P connection, causing a problem that communication will be temporarily suspended.

(1) A first use case will be described. In the first use case, changing an IP address on a portable terminal side following switching of a network, such as switching between a public communication network and Wireless Fidelity (WiFi), may cause disconnection of communication. Accordingly, it may take time to reconnect the portable terminal to the network.

Figure 9:
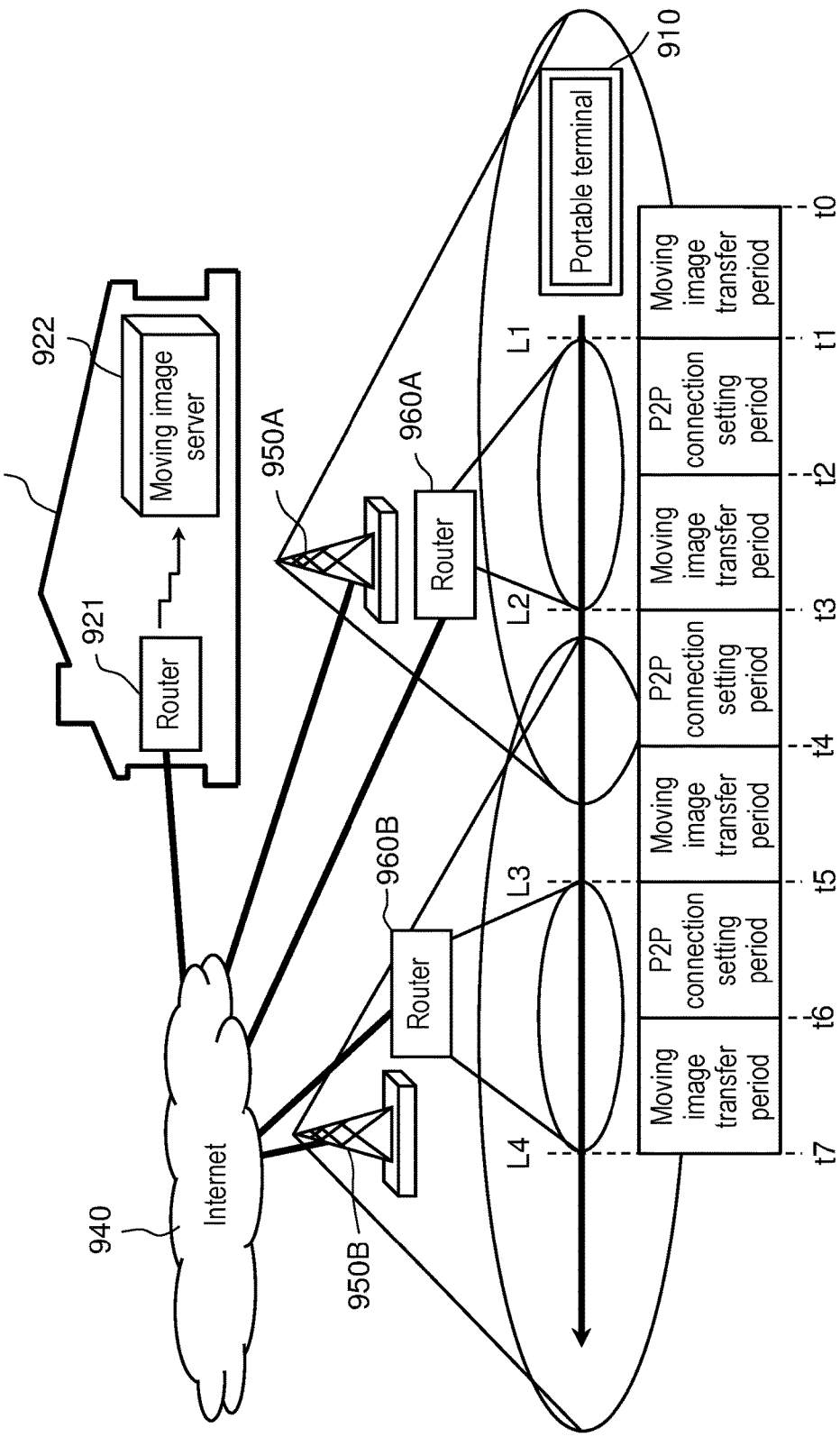
FIG. 9 is a diagram for describing a conventional technique.

Hereinafter, specific description will be provided with reference to FIG. 9. FIG. 9 is a diagram for describing a conventional technique. Note that, in FIG. 9, portable terminal 910 being connected to base station 950A or base station 950B is referred to as "portable terminal 910 is connected to a public communication network". In addition, portable terminal 910 being connected to router 960A or router 960B is referred to as "the portable terminal is connected to WiFi". In addition, it is assumed that portable terminal 910 makes P2P connection to moving image server 922 connected to router 921 inside home 920.

When the network with which portable terminal 910 connects is switched, such as switching between the public communication network and WiFi, the IP address on a portable terminal 910 side is changed. Accordingly, communication such as exchange of content is temporarily disconnected.

If a change in the IP address of portable terminal 910 is completed immediately, the communication will recover. However, a time of several seconds is required for resuming P2P connection. When the network is switched between the public communication network and WiFi, application software such as Web browsing software (hereinafter referred to as "app") operates without any problem. Meanwhile, in communication for exchanging real-time content, such as in a case of receiving a moving image browsing service using P2P connection, operations will be suspended for several seconds every time the network is switched between the public communication network and WiFi.

FIG. 9 illustrates an example in which a user views a moving image with portable terminal 910 while moving by train. FIG. 9 illustrates an example in which each station provides a WiFi public service.

In this example, portable terminal 910 needs to reconnect to the network every time portable terminal 910 enters an area connectable to WiFi of a station (for example, time t1 when portable terminal 910 passes through place L1, time t5 when portable terminal 910 passes through place L3, etc.), or every time portable terminal 910 exits the area connectable to WiFi of the station and enters the public communication network (for example, time t3 when portable terminal 910 passes through place L2, time t7 when portable terminal 910 passes through place L4, etc.). Accordingly, moving image viewing by the user will be suspended for a period needed for portable terminal 910 to resume P2P connection (in the example illustrated in FIG. 9, a period from time t1 to time t2, a period from time t3 to time t4, and a period from time t5 to time t6). It is not preferable for the user who is viewing a moving image that moving image viewing is suspended in this way.

(2) A second use case will be described. In the second use case, communication may be disconnected when an app recedes into a background, and when the app recovers to a foreground from a background, it may take time to recover to an original communication state (that is, to make reconnection).

In a portable terminal, such as a smartphone and a tablet, during an operation of one app, even if the app disappears from a screen when another app is activated or a home button is pressed, the app may be operating in a background.

In general, when the app operating in a background is transitioned to a foreground, the app recovers in an original state. Therefore, for example, for a user who uses a moving image viewing app that uses P2P connection, moving image playback is preferably resumed immediately when the app is transitioned from a background to a foreground. However, in general, an operating system (OS) mounted in a portable terminal, such as a smartphone, does not permit the app to continue communication during operation in a background. When the app transitions from a foreground to a background, P2P connection is disconnected. Accordingly, when the app is transitioned from a background to a foreground, a period of several seconds is required for resuming P2P connection. Therefore, moving image playback is not immediately resumed on the moving image viewing app that transitions to a foreground.

Thus, in the conventional P2P connection technique, when portable terminal 910 moves so that the connected network changes during P2P connection between portable terminal 910 outside home and the terminal inside home (for example, moving image server 922) leading to temporary disconnection of communication and a change in the IP address of portable terminal 910, it may take time to resume P2P connection. In addition, once the app is transitioned from a foreground to a background and communication is disconnected, it may take time for the app that transitions again to a foreground to resume communication. Accordingly, under such a situation, a problem may arise that real-time data exchange (for example, moving image playback, etc.) is suspended between P2P-connected devices.

However, many conventional P2P connection techniques give priority to improvement in a connection success rate, whereas few P2P connection techniques pay attention to time needed for connection. This is because, for example, in a state where portable terminal 910 does not move to such an extent that the connected network changes, such as communication inside home, the IP addresses of both P2P-connected devices do not change after P2P connection at the app activation, and a phenomenon in which exchange of real-time data is suspended does not occur. As described in the above-described two use cases, once P2P connection is disconnected while communication is made between P2P-connected devices, a problem arises that it takes time to resume P2P connection and that communication of content will be temporarily suspended.

Therefore, the present disclosure improves the above-described two problems by enhancing the conventional P2P connection technique. That is, when connection for making direct communication on an equal footing with each other is made for the first time, such as P2P connection, information necessary for the connection is stored on a portable terminal side, and the stored information is used for making second or subsequent connection. This allows reduction in a procedure necessary for connection, and thus allows reduction in time necessary for establishing connection. For example, when the network is switched from the public communication network to WiFi (or when the network is switched from WiFi to the public communication network), it is possible to reduce suspension of moving image playback caused by a change in the IP address on a portable terminal side, and suspension of moving image playback when the app recovers to a foreground.

The exemplary embodiments will be described in detail below with reference to the drawings as needed. However, a description more detailed than necessary may be omitted. For example, a detailed description of an already well-known matter and a repeated description of substantially identical components may be omitted. This is intended to avoid the following description from becoming unnecessarily redundant and to make the description easier for a person skilled in the art to understand.

It is to be noted that the accompanying drawings and the following description are provided in order for a person skilled in the art to fully understand the present disclosure, and are not intended to limit the subject described in the appended claims.

In addition, each diagram is a schematic diagram and is not necessarily illustrated strictly. In addition, in each diagram, identical symbols are used to refer to identical components.

First Exemplary Embodiment

A first exemplary embodiment will be described below with reference to FIG. 1 to FIG. 8.

[1-1. Configuration of Connection System]

Figure 1:
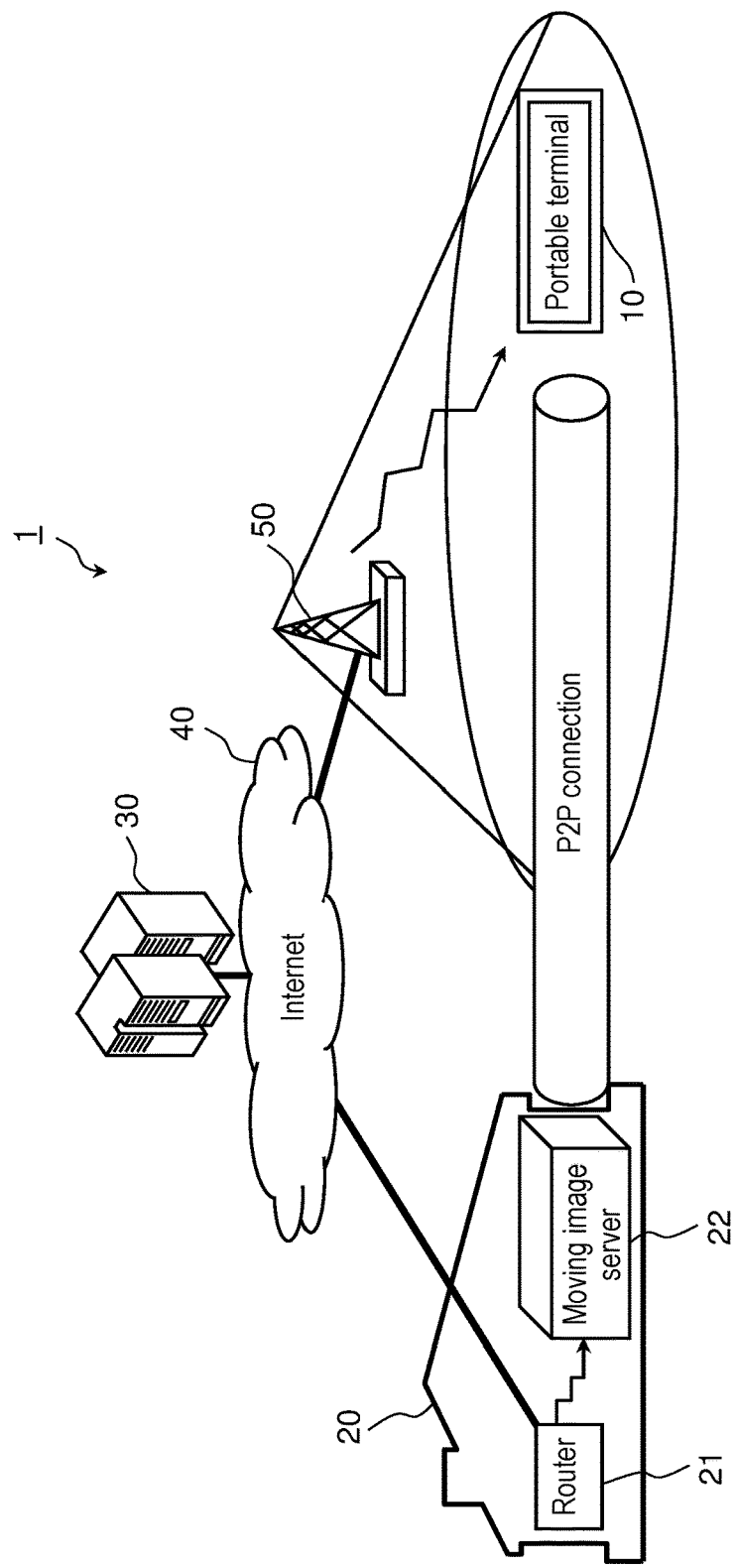
FIG. 1 is a schematic diagram illustrating one example of a connection system according to a first exemplary embodiment.

FIG. 1 is a schematic diagram illustrating one example of a connection system according to the first exemplary embodiment.

Connection system 1 illustrated in FIG. 1 includes portable terminal 10, router 21 and moving image server 22 inside home 20, and support server 30. Connection system 1 makes connection for portable terminal 10 to make direct communication with moving image server 22 on an equal footing.

Internet 40 is one example of a network and is one example of a public wireless communication network.

Router 21 is one example of a router inside home, and is connected to Internet 40. Note that, when there are one network (for example, this network is referred to as "first network") and a network different from the first network (for example, this network is referred to as "second network"), the router inside home means a router which has NAT function and is connected to the first network.

Moving image server 22 is one example of a terminal inside home, and is connected to router 21. Moving image server 22 is connected to Internet 40 via router 21. Note that the terminal inside home means a terminal which is connected to the router inside home and makes communication the other network by using the NAT function of this router inside home. A terminal outside home means a terminal which is connected to a network (that includes the second network) other than the first network. Viewing a moving image stored in the terminal inside home by using the terminal outside home means to see a moving image, which is stored in the moving image server connected to the first network, on the terminal outside home by connecting to the moving image server from the terminal outside home via the second network.

Portable terminal 10 is a smartphone, a tablet, or the like, and makes direct communication outside home with moving image server 22 on an equal footing. Note that "direct communication on an equal footing" means communication in a state where terminals which have an equal relationship are directly connected to each other. As one example of direct communication on an equal footing, communication of peer-to-peer (P2P) connection may be cited. An operational example for making direct communication on an equal footing by P2P connection will be described below. However, direct communication on an equal footing is not limited to P2P connection at all.

As illustrated in FIG. 1, portable terminal 10 is wirelessly connected to base station 50. When making first P2P connection, portable terminal 10 makes P2P connection to moving image server 22 by using support server 30.

Note that in order to make P2P connection between portable terminal 10 outside home and moving image server 22, which is a terminal inside home 20, portable terminal 10 and moving image server 22 need to communicate with each other over network address translation (NAT) of router 21.

[1-2. Configuration of Portable Terminal]

Next, a configuration of portable terminal 10 will be described.

Figure 2:
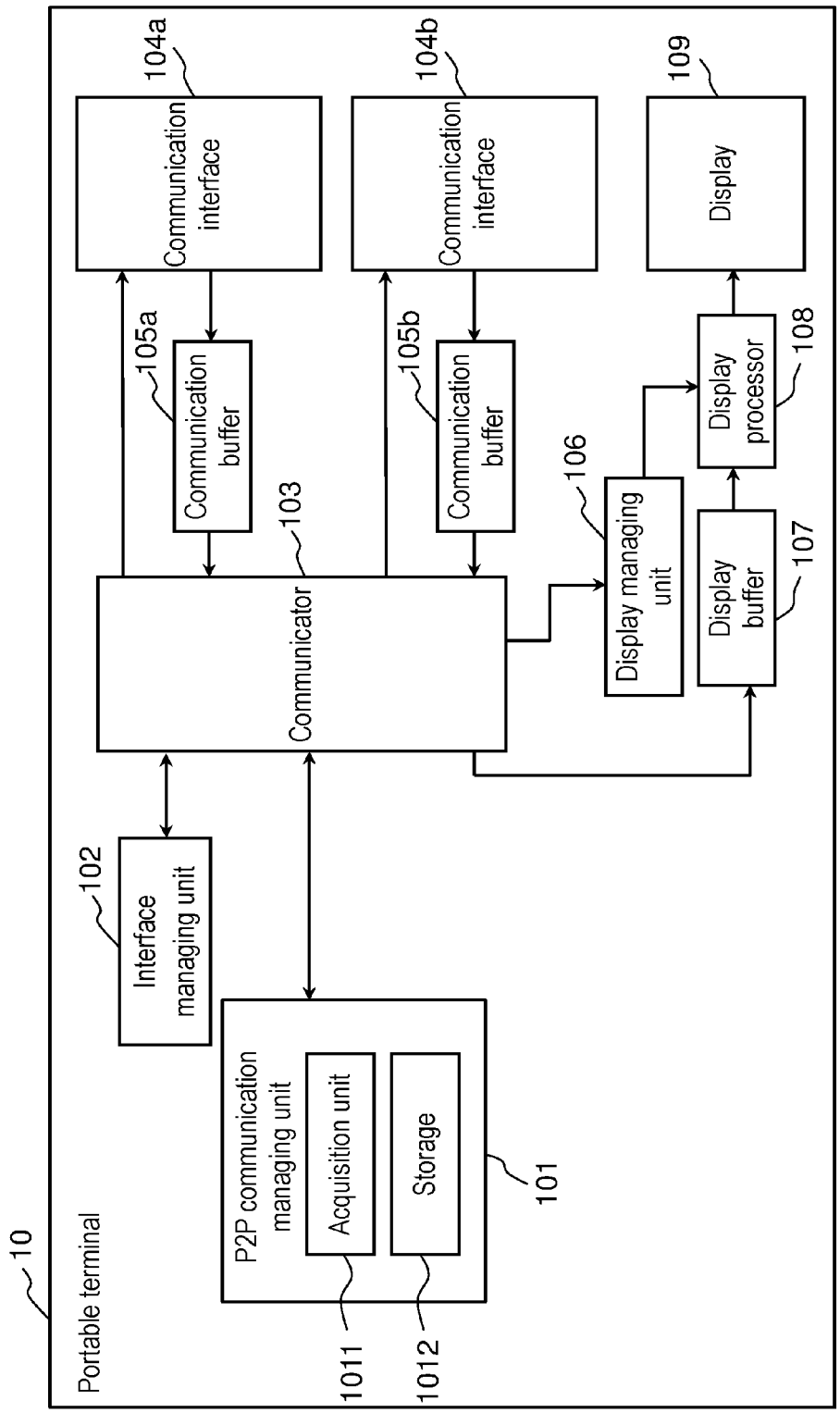
FIG. 2 is a block diagram illustrating one example of a configuration of a portable terminal according to the first exemplary embodiment.

FIG. 2 is a block diagram illustrating one example of the configuration of portable terminal 10 according to the first exemplary embodiment.

Portable terminal 10 illustrated in FIG. 2 includes P2P communication managing unit 101, interface managing unit 102, communicator 103, communication interface 104a, communication interface 104b, communication buffer 105a, communication buffer 105b, display managing unit 106, display buffer 107, display processor 108, and display 109.

P2P communication managing unit 101 includes acquisition unit 1011 and storage 1012.

Acquisition unit 1011 acquires connection information used for connection for portable terminal 10 to make P2P communication with moving image server 22, which is terminal inside home 20, via support server 30 connected to a first network. This connection information includes an Internet protocol (IP) address and port number which are set in router 21, and information that indicates a type of router 21, for making communication with moving image server 22, which is a terminal inside home 20, by router 21 inside home 20. Note that the information indicating the type of router inside home is information indicating that an NAT method of router 21 is classified into Full-Cone NAT.

Acquisition unit 1011 acquires the connection information via support server 30, for example, when portable terminal 10 connects with the first network. In addition, for example, when portable terminal 10 connects with a second network different from the first network, acquisition unit 1011 connects with support server 30 via the second network and then acquires the connection information via support server 30.

Acquisition unit 1011 may further acquire key information for establishing second or subsequent connection issued by moving image server 22 for making P2P communication. In addition, when connection for making P2P communication is established, acquisition unit 1011 may acquire updated key information obtained by update of the key information issued by moving image server 22. Note that certain use restriction may be imposed on the key information, such as expiration date and valid use count.

Storage 1012 stores the connection information acquired by acquisition unit 1011. In addition, storage 1012 further stores the key information or updated key information acquired by acquisition unit 1011.

Interface managing unit 102 manages communication interface 104a and communication interface 104b. Interface managing unit 102 performs management, for example, to use communication interface 104a when communicator 103 makes communication over a public wireless communication network, and to use communication interface 104b when communicator 103 makes communication by Wireless Fidelity (WiFi) (wireless local area network (LAN)).

Communicator 103 communicates with support server 30 via communication interface 104a or communication interface 104b, and transmits a request for the connection information used for connection for making P2P communication, or receives a response to the request. In addition, communicator 103 makes P2P communication with moving image server 22 via communication interface 104a or communication interface 104b.

In the present exemplary embodiment, communicator 103 makes connection for portable terminal 10 to make P2P communication with moving image server 22, which is a terminal inside home 20, by using the connection information acquired by acquisition unit 1011 (this connection made at first time is hereinafter referred to as "first connection"). In addition, for example, when the connection of portable terminal 10 switches from the first network to the second network different from the first network, communicator 103 makes reconnection by using the connection information stored in storage 1012 (that is, makes connection again with moving image server 22 so that portable terminal 10 makes P2P communication with moving image server 22 via the second network). For example, when the connection of portable terminal 10 switches from the second network to the first network, communicator 103 makes reconnection by using the connection information stored in storage 1012 (that is, makes connection again with moving image server 22 so that portable terminal 10 makes P2P communication with moving image server 22 via the first network).

Note that on receipt of the key information issued by moving image server 22 for making P2P communication, communicator 103 may convey the key information to acquisition unit 1011. In this case, communicator 103 makes the above-described reconnection by using the key information acquired by acquisition unit 1011 in addition to the connection information.

Furthermore, when reconnection for making P2P communication is established and the updated key information for updating the key information issued by moving image server 22 is received, communicator 103 may convey the updated key information to acquisition unit 1011. In this case, when the connection of portable terminal 10 switches from the first network or the second network to a third network, communicator 103 makes reconnection for portable terminal 10 to make P2P communication with moving image server 22 via the third network by using the updated key information acquired by acquisition unit 1011 in addition to the connection information stored in storage 1012.

Note that the third network may be a network identical to the first network or the second network, and may be a different network. In addition, one of the first network and the second network may be a public wireless communication network, and the other of the first network and the second network may be a WiFi network.

Communication interface 104a and communication interface 104b are communication interfaces for connecting with support server 30 or moving image server 22 via the first network, the second network, or the third network such as Internet 40 as a public communication network or a WiFi network.

Display managing unit 106 causes display processor 108 to process data stored in display buffer 107 (for example, moving image data).

Display 109 displays the data processed by display processor 108 (for example, moving image data).

[1-3. Configuration of Moving Image Server]

Next, a configuration of moving image server 22 will be described.

Figure 3:
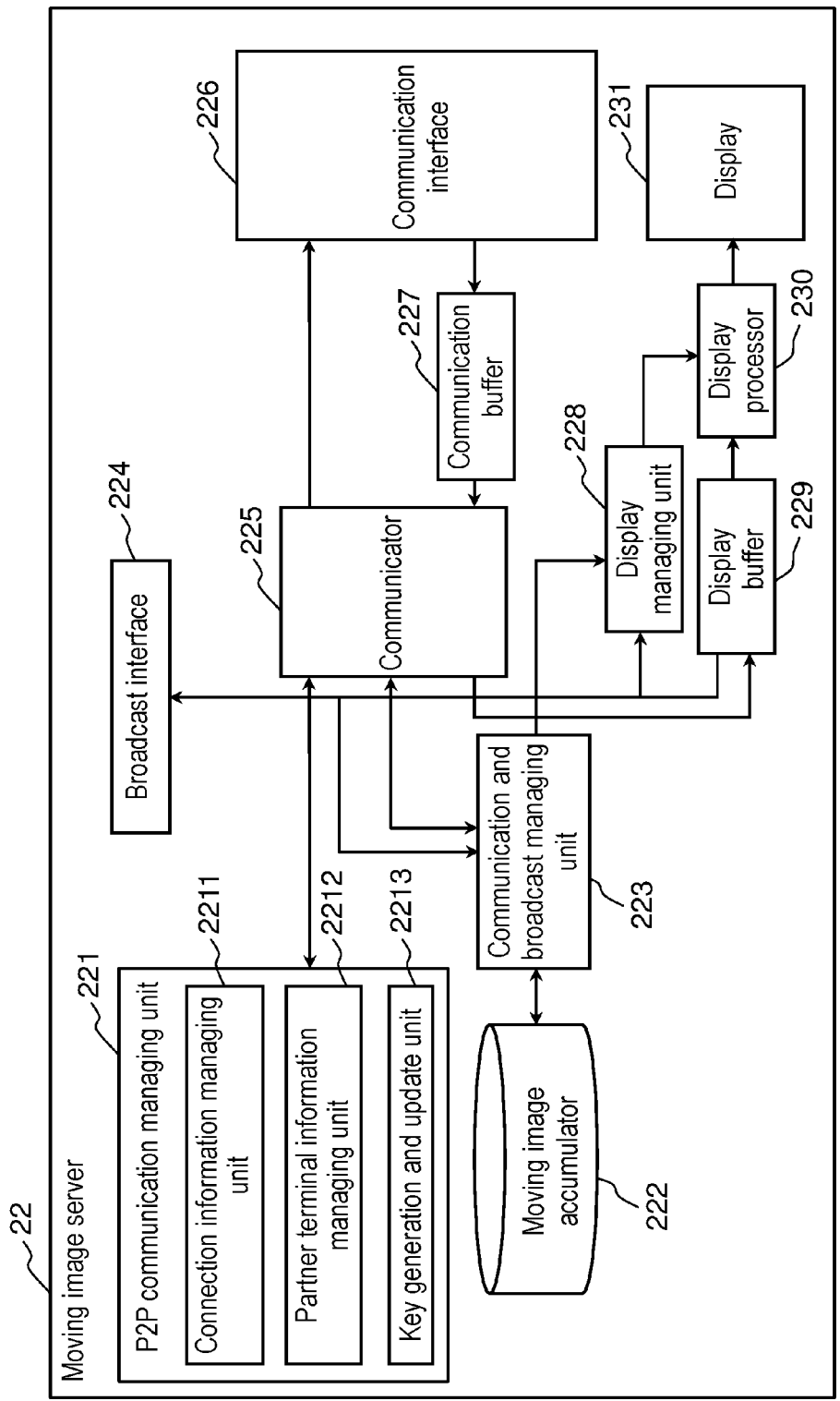
FIG. 3 is a block diagram illustrating one example of a configuration of a moving image server according to the first exemplary embodiment.

FIG. 3 is a block diagram illustrating one example of the configuration of moving image server 22 according to the first exemplary embodiment.

Moving image server 22 illustrated in FIG. 3 includes P2P communication managing unit 221, moving image accumulator 222, communication and broadcast managing unit 223, broadcast interface 224, communicator 225, communication interface 226, communication buffer 227, display managing unit 228, display buffer 229, display processor 230, and display 231.

P2P communication managing unit 221 includes connection information managing unit 2211, partner terminal information managing unit 2212, and key generation and update unit 2213.

Connection information managing unit 2211 manages the IP address and the port number of moving image server 22 which are set in router 21 inside home 20, and the information that indicates the type of router 21 as the connection information used for connection for making P2P communication. Note that the information indicating the type of router inside home is information indicating that the NAT method of router 21 is classified into Full-Cone NAT.

Partner terminal information managing unit 2212 manages information on a partner terminal of P2P connection, for example, portable terminal 10 or the like. The information on the partner terminal includes, for example, the IP address or the like.

When connection for making P2P communication is established, key generation and update unit 2213 generates the key information, or updates the key information. For example, when the connection information is transmitted to portable terminal 10 via support server 30 and first connection for making P2P communication is established between portable terminal 10 and moving image server 22, key generation and update unit 2213 generates the key information and then transmits the generated key information to portable terminal 10. In addition, when reconnection for making P2P communication is established between portable terminal 10 and moving image server 22, key generation and update unit 2213 updates the key information and then transmits the updated key information to portable terminal 10. When a reconnection request comes from portable terminal 10, if valid key information is not received from portable terminal 10, moving image server 22 refuses the reconnection request.

Moving image accumulator 222 accumulates moving image data that records broadcast and moving image data downloaded through the network.

Communication and broadcast managing unit 223 manages communication and broadcast. Communication and broadcast managing unit 223 accumulates, for example, moving image data of broadcast waves acquired via broadcast interface 224 in moving image accumulator 222, or accumulates moving image data downloaded via communicator 225 in moving image accumulator 222. In addition, for example, communication and broadcast managing unit 223 causes communicator 225 to communicate with portable terminal 10, and causes communicator 225 to transmit moving image data accumulated in moving image accumulator 222 to portable terminal 10.

Broadcast interface 224 is an interface for receiving broadcast waves.

Communicator 225 communicates with support server 30 via communication interface 226, and transmits the connection information used for connection for making P2P communication to support server 30. In addition, communicator 103 makes P2P communication with portable terminal 10 via communication interface 226.

Communication interface 226 is a communication interface for making connection to support server 30 or portable terminal 10 via Internet 40 as a public communication network. Communication interface 226 includes a wired/wireless LAN interface or the like.

Display managing unit 228 causes display processor 230 to process data stored in display buffer 229 (for example, moving image data).

Display 231 displays the data processed by display processor 230 (for example, moving image data).

[1-4. Sequence of First Connection]

First, as a comparative example, a conventional P2P connection sequence will be described, and subsequently, a P2P connection sequence of the present disclosure (sequence of first connection) will be described.

Figure 4:
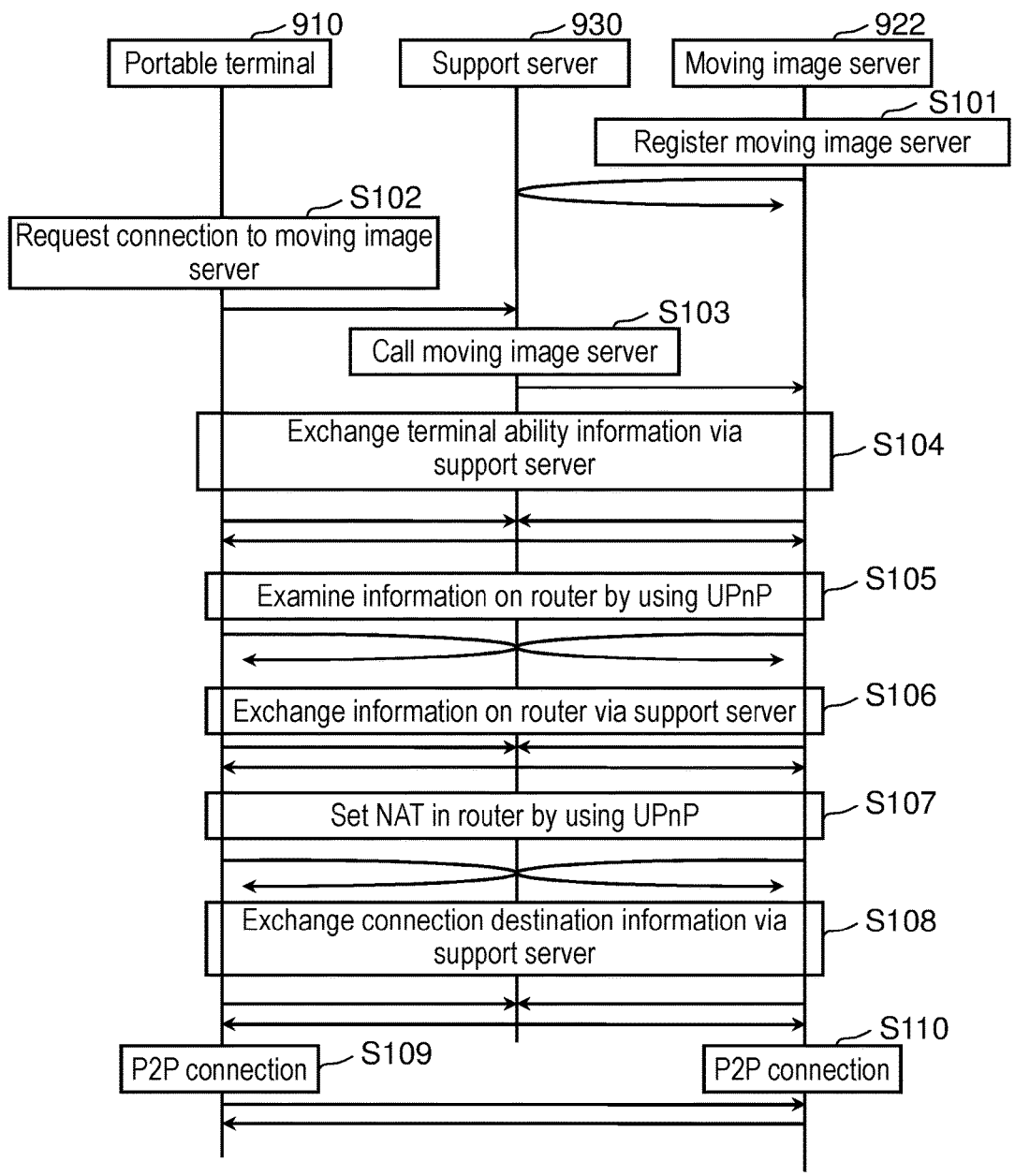
FIG. 4 is a diagram illustrating a sequence of peer to peer (P2P connection in a conventional technique.

FIG. 4 is a diagram illustrating the sequence of P2P connection in the conventional technique.

FIG. 4 illustrates the connection sequence in a case of the method using the above-described universal plug and play (UPnP).

First, moving image server 922, which is a terminal inside home, transmits information on moving image server 922 itself to support server 930 and registers the information therein so that support server 930 can call moving image server 922 (step S101).

Next, in order to make P2P connection to moving image server 922, portable terminal 910 calls support server 930 and requests connection (step S102).

Accordingly, support server 930 calls moving image server 922 (step S103), and then portable terminal 910 and moving image server 922 exchange terminal ability information on moving image server 922 and terminal ability information on portable terminal 910 via support server 930 (step S104).

Next, when portable terminal 910 and moving image server 922 find out that the partner supports the method using UPnP based on the terminal ability information exchanged with each other in step S104, portable terminal 910 and moving image server 922 examine, by using UPnP, information on router 921 inside home 920 to which moving image server 922 is connected (step S105).

Then, portable terminal 910 and moving image server 922 exchange the information on router 921 via support server 930 (step S106).

When router 921 is a router in conformity with universal plug and play-Internet gateway device (UPnP-IGD), portable terminal 910 and moving image server 922 set NAT in router 921 (step S107).

Then, portable terminal 910 and moving image server 922 exchange connection destination information via support server 930 (step S108). Here, the connection destination information refers to the IP address (IP address that is set in an NAT router to correspond to portable terminal 910 when portable terminal 910 connects with the NAT router) and port number of portable terminal 910, and the IP address and port number which are set in router 921 to correspond to moving image server 922.

Then, on receipt of the connection destination information, portable terminal 910 and moving image server 922 establish P2P connection and then start direct communication (P2P communication) (step S109, step S110).

Note that when portable terminal 910 does not support the method using UPnP, or when router 921 is not in conformity with UPnP-IGD, the UDP hole punching method may be used. When the UDP hole punching method is used, portable terminal 910 and moving image server 922 set NAT in router 921 by using UDP hole punching, and then exchange the connection destination information via support server 930. Whichever method is used, there is no substantial difference between the sequence of the present disclosure and the conventional method.

Figure 5:
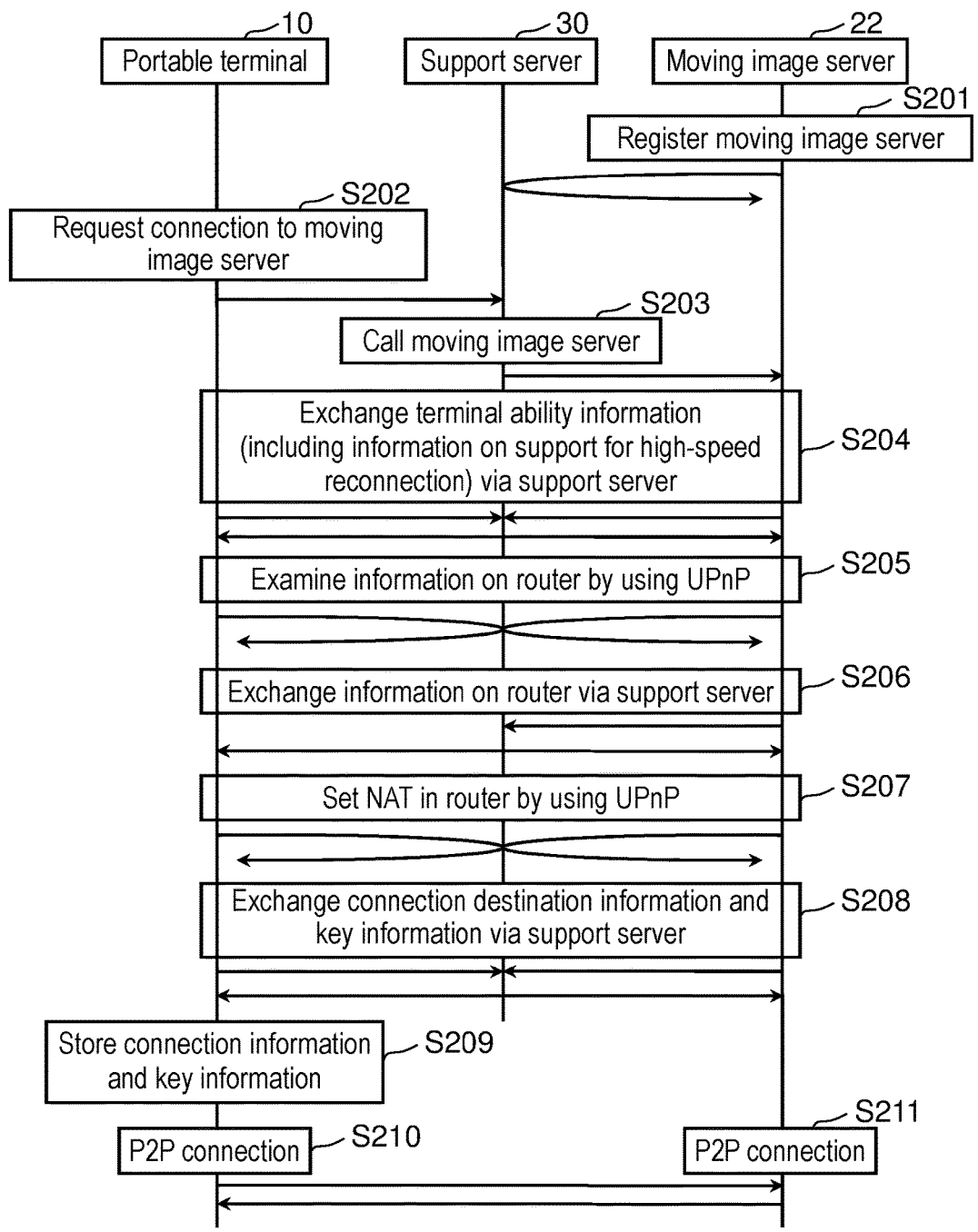
FIG. 5 is a diagram illustrating a sequence of first connection according to the first exemplary embodiment.

FIG. 5 is a diagram illustrating the sequence of first connection according to the first exemplary embodiment.

The sequence of first connection according to the present disclosure illustrated in FIG. 5 differs from the sequence of P2P connection of the conventional example illustrated in FIG. 4 in that the terminal ability information includes information on support for high-speed reconnection, that the key information is exchanged in addition to the connection destination information, and that portable terminal 10 stores the connection information and the key information. Note that in the present exemplary embodiment, connection being resumed in a shorter time than in the conventional technique is referred to as "high-speed reconnection".

First, moving image server 22 transmits information on moving image server 22 itself to support server 30 and registers the information therein so that support server 30 can call moving image server 22 (step S201).

Next, in order to make P2P connection to moving image server 22, portable terminal 10 calls support server 30 and requests connection (step S202, step S203).

Accordingly, support server 30 calls moving image server 22, and then portable terminal 10 and moving image server 22 exchange terminal ability information on moving image server 22 and terminal ability information on portable terminal 10 via support server 30 (step S204). This terminal ability information includes information on support for high-speed reconnection.

Next, based on the terminal ability information exchanged with each other in step S204, portable terminal 10 and moving image server 22 examine, by using UPnP, information on router 21 inside home 20 to which moving image server 22 is connected (step S205).

Then, portable terminal 10 and moving image server 22 exchange the information on router 21 via support server 30 (step S206).

When router 21 is a router in conformity with UPnP-IGD, portable terminal 10 and moving image server 22 set NAT in router 21 (step S207).

Then, portable terminal 10 and moving image server 22 exchange the connection destination information via support server 30, and further exchange the key information (step S208). Here, the connection destination information is the IP address of portable terminal 10, the IP address of moving image server 22 assigned by router 21, and the port number of moving image server 22. The key information is information required when portable terminal 10 establishes P2P connection.

Next, portable terminal 10 stores the connection information and the key information in storage 1012 (step S209). The connection information includes the IP address assigned to moving image server 22 by router 21, the port number of moving image server 22, and the information that indicates the type of router 21.

Then, based on the exchanged connection information, portable terminal 10 establishes P2P connection to moving image server 22, and then starts P2P communication (step S210, step S211).

Thus, as compared with the sequence of P2P connection of the conventional example illustrated in FIG. 4, the sequence of first connection illustrated in FIG. 5 additionally has processing including exchange of the terminal ability information including information that indicates support for high-speed reconnection, which is information indicating that high-speed reconnection to each other is possible, exchange of the key information, and storage of the connection information (the connection destination information on the partner terminal and the information on the router) and the key information. However, time needed for such processing is as short as substantially negligible, and a possibility that such processing will cause a delay is low.

[1-5. Sequence of Reconnection]

Figure 6:
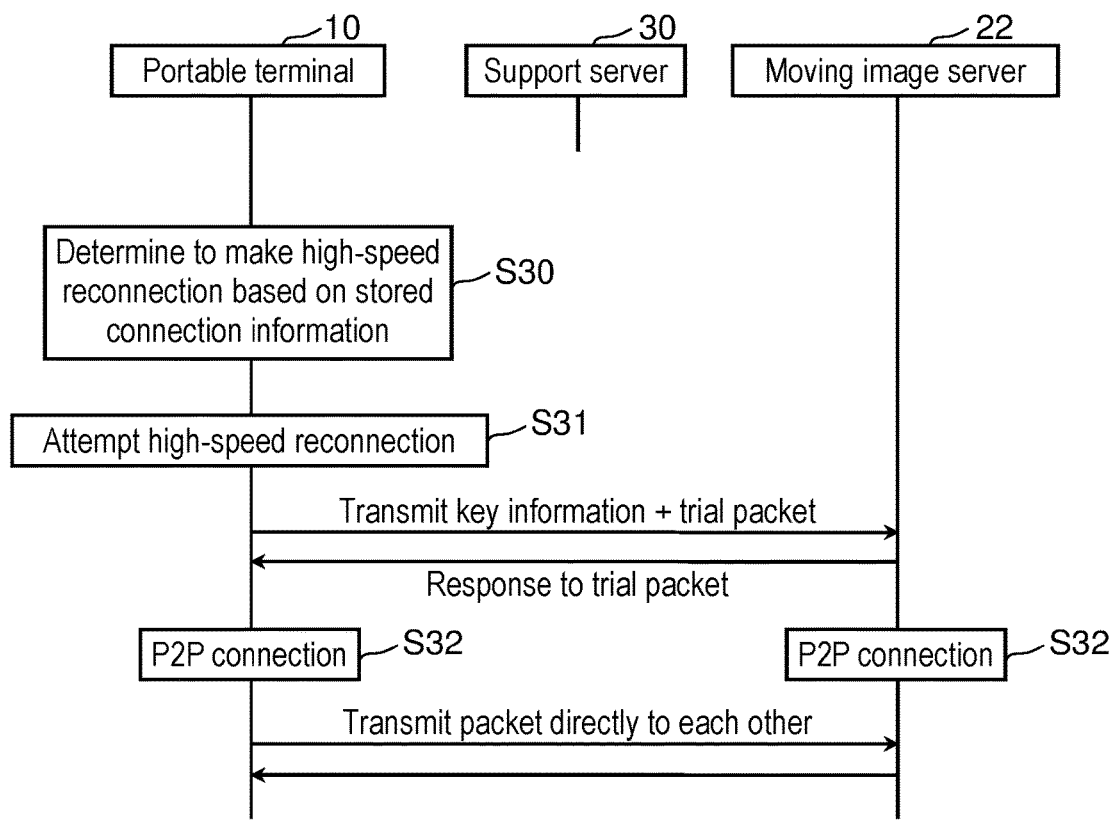
FIG. 6 is a diagram illustrating a sequence of reconnection according to the first exemplary embodiment.

FIG. 6 is a diagram illustrating the sequence of reconnection according to the first exemplary embodiment.

First, on determination to make high-speed reconnection based on the connection information stored in storage 1012 (step S30), portable terminal 10 attempts high-speed reconnection (step S31). A process of determination to make high-speed reconnection will be described later.

When attempting high-speed reconnection, portable terminal 10 transmits a trial packet including the key information stored in storage 1012 to the IP address and port number of router 21 corresponding to moving image server 22. The IP address and port number of router 21 are included in the connection information stored in storage 1012.

Then, on receipt of a response to the trial packet from moving image server 22, portable terminal 10 determines that P2P connection is possible, makes P2P connection to moving image server 22 (step S32), and then portable terminal 10 and moving image server 22 start packet communication for directly transmitting packets to each other.

Thus, in the reconnection sequence illustrated in FIG. 6, portable terminal 10 transmits the trial packet including the key information to moving image server 22. When moving image server 22 permits the connection, portable terminal 10 can immediately establish P2P connection for sending packets directly to the partner. In the above-described reconnection sequence, the sequence can be significantly reduced compared with the sequence of P2P connection of the conventional example.

Here, details of specific processing of step S30, that is, processing for portable terminal 10 to determine high-speed reconnection will be described with reference to FIG. 7.

Figure 7:
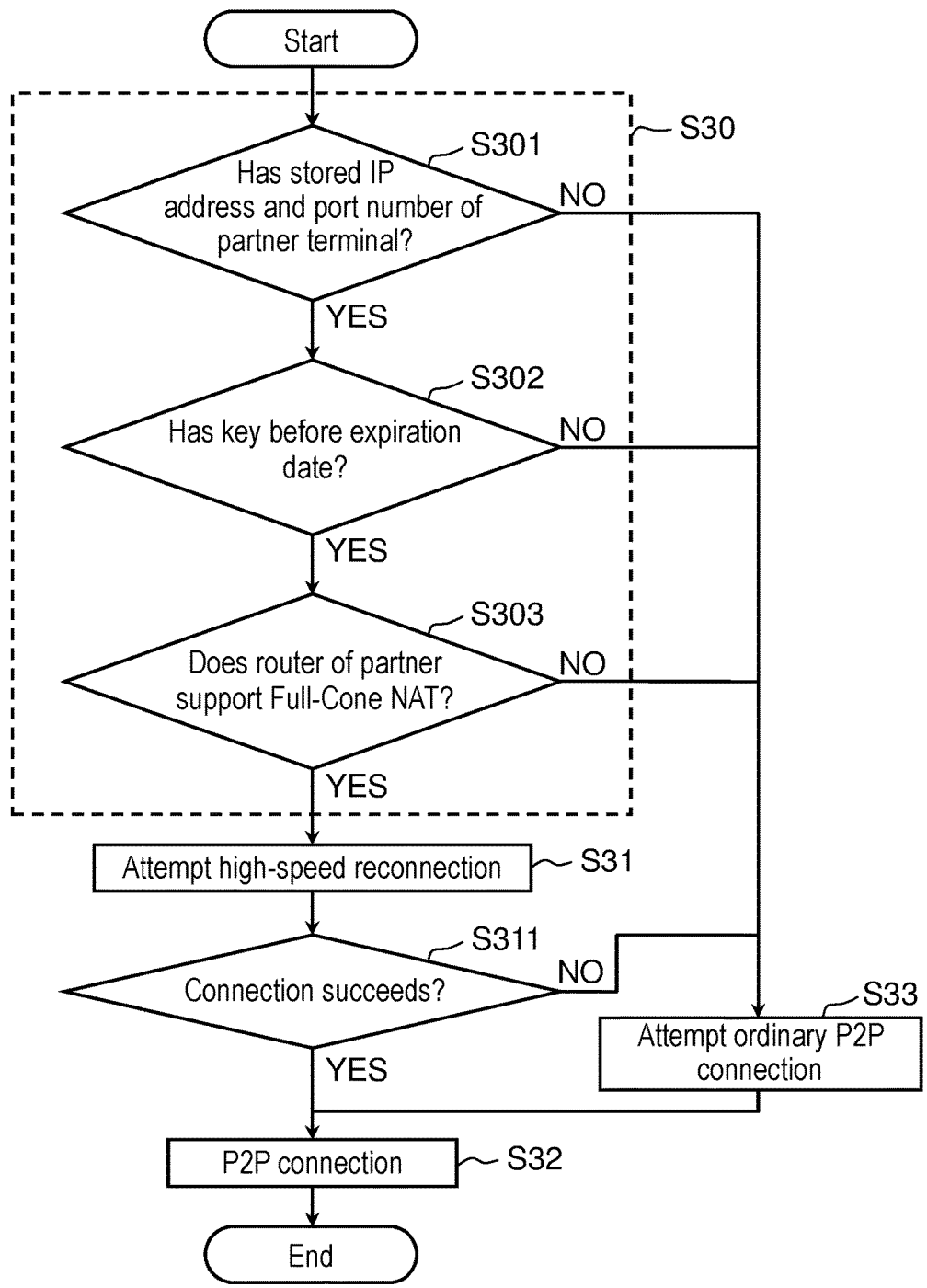
FIG. 7 is a flowchart illustrating details of processing for the portable terminal to determine high-speed reconnection according to the first exemplary embodiment.

FIG. 7 is a flowchart illustrating details of processing for portable terminal 10 to determine high-speed reconnection according to the first exemplary embodiment.

In step S30 illustrated in FIG. 6, first, portable terminal 10 confirms whether storage 1012 has stored the IP address and port number of the partner terminal which is a P2P connection destination (step S301).

In the operational example illustrated in the present exemplary embodiment, portable terminal 10 confirms whether storage 1012 has stored the IP address and port number of router 21 corresponding to moving image server 22.

In step S301, upon confirmation that storage 1012 has stored the IP address and port number of the partner terminal (Yes in step S301), portable terminal 10 confirms whether storage 1012 has the key before expiration date (step S302).

In step S302, portable terminal 10 confirms whether storage 1012 has stored the key information exchanged with moving image server 22 when first connection for making P2P communication is established, the key information being issued by moving image server 22. Furthermore, portable terminal 10 confirms whether the key information is before expiration date.

In step S302, upon confirmation that storage 1012 has the key information before expiration date (Yes in step S302), portable terminal 10 confirms whether router 21, which is the partner of communication, supports Full-Cone NAT (step S303).

If Yes in step S303, step S31 illustrated in FIG. 6 and step S311 will be executed. Duplicate description of step S31 will be omitted.

In step S311, portable terminal 10 transmits the trial packet including the key information stored in storage 1012 to moving image server 22, and then confirms whether connection succeeds by whether there is any response from moving image server 22. If connection succeeds (Yes in step S311), portable terminal 10 executes step S32. These specific processing steps are as described above, and duplicate description will be omitted.

Thus, after determining whether high-speed reconnection can be made through each processing step of step S301 to step S303, portable terminal 10 attempts reconnection. In this way, portable terminal 10 can resume P2P connection in a shorter time.

Note that upon determination that high-speed reconnection cannot be made (No in step S301, No in step S302, No in step S303, or No in step S311), portable terminal 10 makes ordinary P2P connection (step S33). This does not decrease a connection rate when portable terminal 10 makes P2P connection to moving image server 22 as compared with the conventional technique.

For example, if processing of step S33 is applied to the two use cases described in the underlying knowledge forming a basis of the present disclosure, since portable terminal 10 makes ordinary P2P connection, for example, when resuming moving image playback, moving image playback stops for several seconds. In this case, for example, portable terminal 10 displays a screen indicating that P2P reconnection is being made on a display screen for several seconds, during which portable terminal 10 completes ordinary P2P connection, and can then resume moving image playback.

Note that these general or specific aspects may be implemented using a system, a method, an integrated circuit, a computer program, or a computer-readable recording medium such as a compact disc-read only memory (CD-ROM), or may be implemented using any combination of a system, a method, an integrated circuit, a computer program, and a computer-readable recording medium.

[1-6. Effect, Etc.]

As described above, a connection method according to the present exemplary embodiment is a connection method for a portable terminal outside home to make direct communication with a terminal inside home on an equal footing. This connection method is a connection method for a case where the terminal inside home is connected to a router inside home connected to a first network. The connection method includes: an acquisition step of acquiring, by the portable terminal, connection information used for connection for the portable terminal to make direct communication with the terminal inside home, from a support server connected to the first network; and a storage step of storing the connection information acquired in the acquisition step in the portable terminal. The connection information includes an Internet protocol (IP) address and port number which are set in the router inside home to correspond to the terminal inside home.

Note that portable terminal 10 is one example of the portable terminal outside home. Moving image server 22 is one example of the terminal inside home. Router 21 is one example of the router inside home. Support server 30 is one example of the support server.

Accordingly, while the portable terminal outside home and the terminal inside home make direct communication on an equal footing, even when the IP address of one terminal is changed, connection can be resumed (reconnection can be made) in a shorter time.

The connection information may further include information that represents a type of router inside home.

In addition, in the acquisition step, when the portable terminal directly connects with the first network, the portable terminal may acquire the connection information via the support server. In addition, the connection method may further include: a first connection step of making connection for the portable terminal to make direct communication with the terminal inside home by using the connection information acquired in the acquisition step; and a reconnection step of, when connection of the portable terminal switches from the first network to a second network different from the first network, making reconnection for the portable terminal to make direct communication with the terminal inside home via the second network by using the connection information stored in the storage step.

In addition, in the acquisition step, when the portable terminal connects with a second network different from the first network, the portable terminal may connect with the support server via the second network and may acquire the connection information via the support server. In addition, the connection method may further include: a first connection step of making connection for the portable terminal to make direct communication with the terminal inside home by using the connection information acquired in the acquisition step; and a reconnection step of, when the connection of the portable terminal switches from the second network to the first network, making reconnection for the portable terminal to make direct communication with the terminal inside home via the first network by using the connection information stored in the storage step.

Accordingly, while the portable terminal outside home and the terminal inside home make direct communication on an equal footing, even when the IP address of one terminal is changed, connection can be resumed (reconnection can be made) more quickly.

The connection method according to the present exemplary embodiment allows significant reduction in suspension time of moving image playback that takes place, for example, when P2P connection is resumed, by the portable terminal outside home making reconnection to the terminal inside home by using the connection information acquired when first connection is made. Unlike the portable terminal outside home, the terminal inside home, for example, moving image server 22 has a combination of the IP address and port number that is extremely unlikely to be changed. Therefore, if the portable terminal outside home (for example, portable terminal 10) can acquire the IP address and port number corresponding to the terminal inside home (for example, moving image server 22) which are set in the router inside home, and the type of router, the portable terminal outside home can make reconnection (P2P connection) to the terminal inside home with which first connection is made in a relatively short time without exchanging various pieces of information via the support server (for example, support server 30). That is, if the portable terminal holds information on the terminal inside home acquired when first connection is made, time needed for resuming connection for P2P communication can be significantly reduced.

In addition, the acquisition step may further include a key acquisition step of acquiring, by the portable terminal, key information for establishing connection for making direct communication, the key information being issued by the terminal inside home. In addition, in the reconnection step, the portable terminal may make the reconnection by using the key information acquired in the key acquisition step in addition to the connection information.

In addition, the connection method may further include an updated key acquisition step of acquiring, by the portable terminal, updated key information which is the key information updated by the terminal inside home when connection for making direct communication is established. In addition, in the reconnection step, when the connection of the portable terminal switches from the first network or the second network to a third network, the portable terminal may make reconnection for making direct communication with the terminal inside home via the third network by using the updated key information acquired in the updated key acquisition step in addition to the connection information stored in the storage step.

The third network may be a network identical to the first network or the second network.

In addition, one of the first network and the second network may be a public wireless communication network, whereas the other of the first network and the second network may be a wireless LAN.

Thus, when the portable terminal makes reconnection to the terminal inside home without via the support server, reconnection using the key information can reduce vulnerability from a security standpoint.

Specific description will be provided below. It is assumed here that the direct communication is P2P communication. In a case where the IP address on a portable terminal side is changed during the direct communication, if access to the terminal inside home is permitted from the portable terminal without exchange of various pieces of information via the support server, vulnerability is revealed from a security standpoint. This is because the terminal inside home cannot determine whether the access is made by the portable terminal with the IP address changed, the portable terminal being permitted to make P2P connection, or whether the access is made by a terminal different from the portable terminal that is permitted to make connection. Accordingly, the terminal inside home may permit access from a terminal that is not permitted to make connection. Although depending on the type of router to which the terminal inside home is connected, in general, it is relatively easy for a third party to estimate the IP address and port number of the terminal inside home that is accessed from the terminal outside home by using a public communication network such as a public wireless LAN service.

In the present exemplary embodiment, when first P2P connection is permitted, the terminal inside home issues, to the portable terminal, the key information for permitting next access. This allows reduction in vulnerability from a security standpoint by making reconnection using the key information, even when the portable terminal makes reconnection to the terminal inside home without via the support server.

In addition, the information that indicates the type of router inside home may indicate that the NAT method of the router inside home is classified into Full-Cone NAT.

Accordingly, based on the information that indicates the type of router inside home, the portable terminal can attempt reconnection after making a determination whether connection for making direct communication can be made in a short time (that is, high-speed reconnection can be made). Therefore, the portable terminal can resume connection for making direct communication in a shorter time.

Specific description will be provided below. Again, description will be provided assuming that the direct communication is P2P communication.

The connection method according to the present disclosure may not operate depending on the NAT type of router. For example, a router of the NAT method called Restricted-Cone NAT does not allow access from an IP address other than the IP address of the portable terminal that starts communication from the terminal inside home. Accordingly, if the IP address of the portable terminal is changed by switching from a public communication network to WiFi or the like, access from the portable terminal after the IP address change will be refused by the router.

Therefore, in the connection method disclosed in the present exemplary embodiment, when making first connection, the portable terminal determines whether the router to which the terminal inside home is connected is a router that allows reconnection without via the support server. Only when reconnection without via the support server is allowed, the portable terminal performs the above-described connection method.

Thus, whether high-speed reconnection is possible without via the support server can be determined by the type of router. Accordingly, after the determination is made, the portable terminal is unlikely to have a relatively long waiting time during an attempt to make reconnection.

Thus, the connection method according to the present exemplary embodiment enables reconnection to the communication partner in a shorter time even when the IP address of one terminal is changed and communication is disconnected during direct communication on an equal footing with each other.

Other Exemplary Embodiments

As described above, the first exemplary embodiment has been described as illustration of the technique to be disclosed in this application. However, the technique in the present disclosure is not limited to this example, and may be applied to exemplary embodiments to which changes, replacements, additions, and omissions have been made. In addition, it is also possible to make a new exemplary embodiment by combining components described in the above-described first exemplary embodiment.

Therefore, other exemplary embodiments will be described below.

The first exemplary embodiment has described the use case when communication is disconnected by a change in the Internet protocol (IP) address on a portable terminal side accompanying network switching by way of example. However, the present disclosure is not limited to this use case at all. For example, the connection method according to the present disclosure is applicable to a case where communication is disconnected when the app recedes into a background, which has been described as the second use case.

The connection method according to the present disclosure allows reduction in time needed for making reconnection from the portable terminal to the terminal inside home (high-speed reconnection) even when the app of the portable terminal once transitions to a background and then recovers from a background to a foreground while the portable terminal makes direct communication with the terminal inside home (for example, moving image server 22) on an equal footing.

One exemplary embodiment thereof will be described with reference to FIG. 8.

Figure 8:
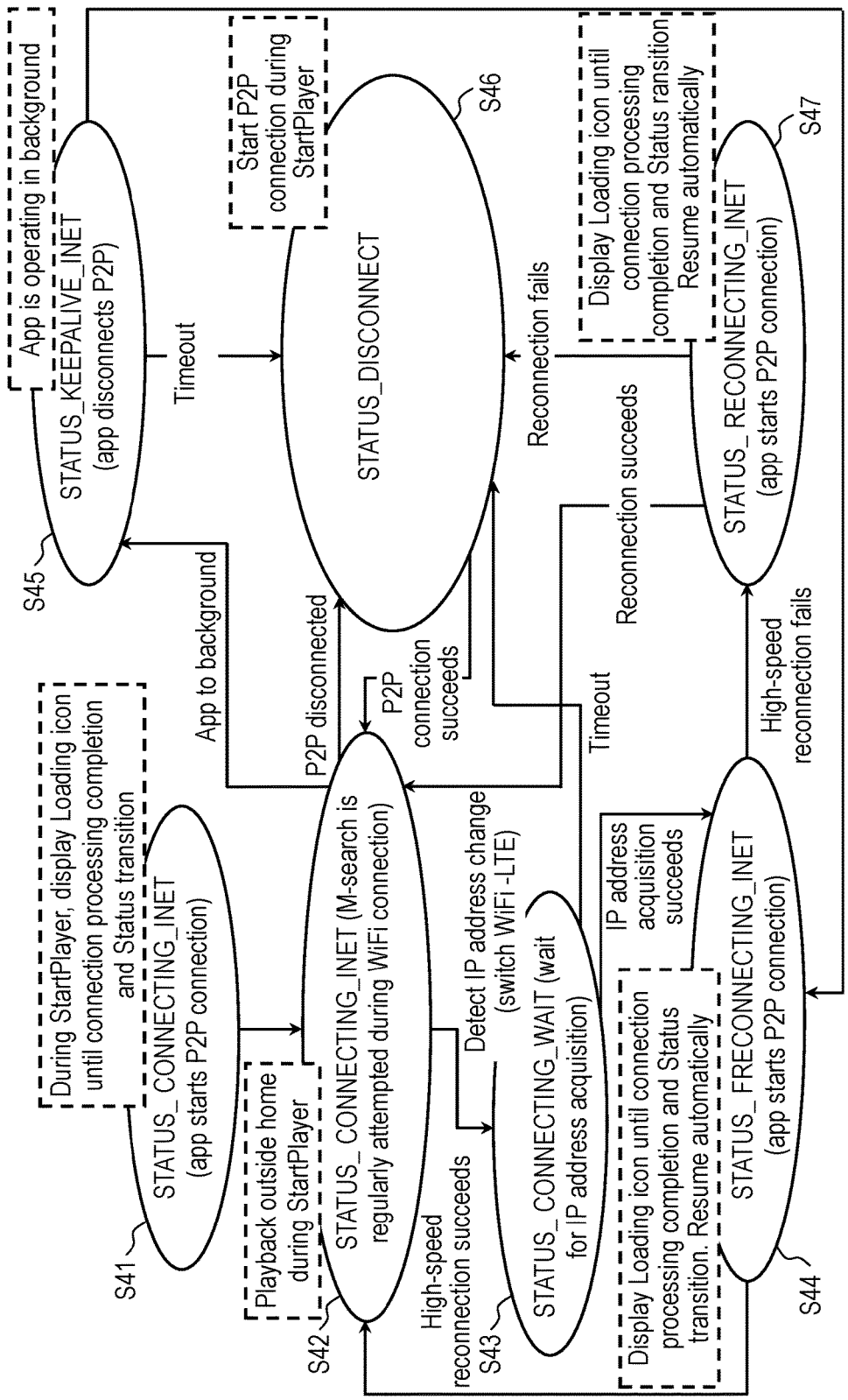
FIG. 8 is a state transition diagram of application software of the portable terminal according to another exemplary embodiment.

FIG. 8 is a state transition diagram of an app of portable terminal 10 according to another exemplary embodiment.

First, the app of portable terminal 10 starts peer-to-peer (P2P) connection (step S41).

In step S41, as described above, the app exchanges the terminal ability information, the connection information, and the key information with the partner terminal that makes peer to peer (P2P) communication, and then stores each piece of acquired information in storage 1012 of portable terminal 10.

M-Search is regularly attempted during Wireless Fidelity (WiFi) connection (step S42).

In step S43, the IP address of portable terminal 10 is changed. In step S44, the app of portable terminal 10 with the IP address changed attempts resumption of P2P connection (reconnection). Here, high-speed reconnection can be achieved because the connection method disclosed in the exemplary embodiment is applied.

Note that step S45 illustrates an operational example in which P2P connection is disconnected because the app transitions to a background. When the app recovers to a foreground from a background, processing moves to step S44, and portable terminal 10 attempts the above-described high-speed reconnection.

However, as illustrated in step S46, depending on the type of app or an operating system (OS) of the portable terminal on which the app operates, P2P connection by the app is permitted and P2P connection is attempted even while the app is operating in a background.

In step S46, ordinary P2P connection is attempted.

In step S47, the app starts P2P connection.

Thus, even when the app of the portable terminal once transitions to a background and then recovers from a background to a foreground, the connection method according to the present exemplary embodiment allows reduction in time needed for reconnection from the portable terminal to the terminal inside home (high-speed reconnection).

Access to the terminal inside home from the portable terminal is made by the P2P connection technique. Depending on the use case peculiar to the portable terminal, a problem may arise, for example, that a moving image a user is viewing is suspended. The connection method according to the present disclosure allows reduction in time needed for establishment of second or subsequent P2P connection by storing the connection information on the terminal inside home in the portable terminal at a time of first connection. Accordingly, for example, suspension time of playback of the moving image the user is viewing can be reduced. Therefore, for example, when the user views a moving image that is in the terminal inside home by using the portable terminal outside home, excellent user experience can be implemented.

In addition, the present disclosure also includes the following cases.

(1) Each of the above-described apparatuses may be implemented by a computer system including a microprocessor, read-only memory (ROM), random-access memory (RAM), hard disk unit, display unit, keyboard, mouse, and the like. The RAM or hard disk unit may store a computer program. Each apparatus may perform functions thereof by the microprocessor operating in accordance with the computer program. Here, the computer program is configured by a combination of a plurality of instruction codes that represent commands for the computer to perform predetermined functions.

(2) Part or all of components that constitute each of the apparatuses may be made of one system large scale integration circuit (LSI). The system LSI is a super-multifunctional LSI manufactured by integration of a plurality of elements on one chip, and is a computer system that includes a microprocessor, a ROM, a RAM, and the like. The ROM stores the computer program. The system LSI achieves the function thereof by the microprocessor loading the computer program from the ROM to the RAM and performing operations such as arithmetic operations in accordance with the loaded computer program.

(3) Part or all of the components that constitute each of the apparatuses may include an integrated circuit (IC) card or a standalone module detachable from each apparatus. The IC card or the module is a computer system that includes a microprocessor, a ROM, a RAM, and the like. The IC card or the module may include the above-described super-multifunctional LSI. The IC card or the module achieves the function thereof by the microprocessor operating in accordance with the computer program. This IC card or this module may be tamper-proof.

(4) The present disclosure may be implemented by the method described above. In addition, these methods may be implemented by a computer program implemented by a computer, or may be implemented by a digital signal made by the computer program.

For example, software that implements an information display apparatus of each of the above-described exemplary embodiments is the following program. That is, this program is a program for causing a computer to execute a connection method for a portable terminal outside home to make direct communication with a terminal inside home on an equal footing. The terminal inside home is connected to a router inside home connected to a network. The connection method includes: an acquisition step of acquiring connection information used for connection for making the communication with the terminal inside home via a support server connected to the network, the connection information including an IP address and a port number which are set in the router inside home to correspond to the terminal inside home; and a storage step of storing the connection information acquired in the acquisition step.

In addition, the present disclosure may be implemented by the computer program or digital signal recorded in a computer-readable recording medium, such as a flexible disk, a hard disk, a compact disc-read only memory (CD-ROM), a magneto-optical disc (MO), a digital versatile disc (DVD), a digital versatile disc-read only memory (DVD-ROM), a digital versatile disc random access memory (DVD-RAM), a Blu-ray (registered trademark) Disc (BD), and a semiconductor memory, for example. In addition, the present disclosure may be implemented by the digital signal recorded in these recording media.

In addition, the present disclosure may transmit the computer program or the digital signal via electric telecommunication lines, wireless or wired communication lines, a network represented by the Internet, data broadcasting, etc.

In addition, the present disclosure may be a computer system including a microprocessor and a memory. The memory may store a computer program, and the microprocessor may operate in accordance with the computer program.

In addition, the present disclosure may be implemented by another independent computer system by recording of the program or digital signal in the recording medium for transportation, or by transportation of the program or digital signal over the network or the like.

(5) Each of the above-described exemplary embodiments and variations may be combined with one another.

As described above, the exemplary embodiments have been described as illustration of the technique in the present disclosure. For this purpose, the accompanying drawings and detailed description have been provided.

Accordingly, the components described in the accompanying drawings and detailed description may include not only components essential for solving problems but also components unessential for solving problems, in order to illustrate the above-described technique. Therefore, it should not be acknowledged immediately that those unessential components be essential because those unessential components are described in the accompanying drawings and detailed description.

In addition, since the above-described exemplary embodiments are intended to illustrate the technique in the present disclosure, various changes, replacements, additions, omissions, etc. can be made within the scope of the appended claims or equivalents thereof.

INDUSTRIAL APPLICABILITY

The present disclosure is applicable to the connection method, the connection system, and the portable terminal for making direct communication on an equal footing with each other. Specifically, the present disclosure is applicable to all devices that use P2P communication, including a P2P module, server, set top box of community antenna television (CATV), security camera, cellular phone, smartphone, tablet terminal, portable computer, and the like.

REFERENCE MARKS IN THE DRAWINGS

1: connection system
10, 910: portable terminal
20, 920: inside home
21, 921: router
22, 922: moving image server
30, 930: support server
40: Internet
50, 950A, 950B: base station
101, 221: P2P communication managing unit
102: interface managing unit
103, 225: communicator
104a, 104b, 226: communication interface
105a, 105b, 227: communication buffer
106, 228: display managing unit
107, 229: display buffer
108, 230: display processor
109, 231: display
222: moving image accumulator
223: communication and broadcast managing unit
224: broadcast interface
960A, 960B: router
1011: acquisition unit
1012: storage
2211: connection information managing unit
2212: partner terminal information managing unit
2213: key generation and update unit

The invention claimed is:
1. A connection method for a portable terminal outside home to make direct communication with a terminal inside home on an equal footing,
the terminal inside home being connected to a router inside home connected to a first network, the connection method comprising:
an acquisition step of acquiring, by the portable terminal, connection information and key information from a support server connected to the first network, the connection information comprising an Internet protocol (IP) address and a port number which are set in the router inside home to correspond to the terminal inside home, the key information being issued by the terminal inside home;
a storage step of storing, in the portable terminal the connection information and the key information acquired in the acquisition step,
a first connection step of making connection for the portable terminal to make the communication with the terminal inside home by using the connection information acquired in the acquisition step;
a reconnection step of, after the connection between the portable terminal and the terminal inside home disconnects, making reconnection for the portable terminal to make the communication with the terminal inside home by using the connection information and the key information stored in the storage step, and
an updated key acquisition step of acquiring, by the portable terminal, updated key information which is the key information updated by the terminal inside home after the connection for making the communication is established,
wherein in the acquisition step, when the portable terminal directly connects with the first network, the portable terminal acquires the connection information and the key information via the support server, in a state in which the portable terminal is directly connected with the first network,
in the reconnection step of, after the connection of the portable terminal switches from the first network to a second network different from the first network, making the reconnection for the portable terminal to make the communication with the terminal inside home via the second network by using the connection information and the key information stored in the storage step, and
in the reconnection step, after the connection of the portable terminal switches from one of the first network and the second network to a third network, the portable terminal makes the reconnection for making the communication with the terminal inside home via the third network by using the updated key information acquired in the updated key acquisition step in addition to the connection information stored in the storage step.

2. The connection method according to claim 1, wherein the connection information further comprises information that indicates a type of the router inside home.

3. The connection method according to claim 1, wherein
in the acquisition step, the portable terminal connects with the support server via the second network and acquires the connection information and key information via the support server, in a state in which the portable terminal is connected with the second network different from the first network, and
in the reconnection step of, after the connection of the portable terminal switches from the second network to the first network, making reconnection for the portable terminal to make the communication with the terminal inside home via the first network by using the connection information and the key information stored in the storage step.

4. The connection method according to claim 1, wherein the third network is a network identical to one of the first network and the second network.

5. A connection system comprising:
a router inside home;
a terminal inside home; and
a portable terminal outside home,
the connection system for making connection for the portable terminal to make communication with the terminal inside home on an equal footing,
the router inside home being connected to a network,
the terminal inside home being connected to the router inside home,
the portable terminal comprising:
an acquisition unit that acquires connection information and key information from a support server connected to the network, the connection information comprising an Internet protocol (IP) address and a port number which are set in the router inside home to correspond to the terminal inside home, the key information being issued by the terminal inside home;
a storage that stores the connection information and the key information acquired by the acquisition unit; and
a communicator that:
makes a first connection to make the communication with the terminal inside home by using the connection information acquired by the acquisition unit, and
when the connection between the portable terminal and the terminal inside home disconnects, makes a reconnection to make the communication with the terminal inside home by using the connection information and the key information stored in the storage,
wherein in an acquisition step, when the portable terminal directly connects with a first network, the portable terminal acquires the connection information and the key information via the support server, in a state in which the portable terminal is directly connected with the first network,
wherein in a reconnection step, after the connection of the portable terminal switches from the first network to a second network different from the first network, making the reconnection for the portable terminal to make the communication with the terminal inside home via the second network by using the connection information and the key information stored in the storage step,
wherein in an updated key acquisition step, updated key information, which is the key information updated by the terminal inside home after the connection for making the communication is established, is acquired by the portable terminal, and
wherein in the reconnection step, after the connection of the portable terminal switches from one of the first network and the second network to a third network, the portable terminal makes the reconnection for making the communication with the terminal inside home via the third network by using the updated key information acquired in the updated key acquisition step in addition to the connection information stored in the storage step.

6. The connection method for a portable terminal outside home to make direct communication with a terminal inside home on an equal footing,
the terminal inside home being connected to a router inside home connected to a first network,
the connection method comprising:
an acquisition step of acquiring, by the portable terminal, connection information and key information from a support server connected to the first network, the connection information comprising an Internet protocol (IP) address and a port number which are set in the router inside home to correspond to the terminal inside home, the key information being issued by the terminal inside home;

a storage step of storing, in the portable terminal the connection information and the key information acquired in the acquisition step, a first connection step of making connection for the portable terminal to make the communication with the terminal inside home by using the connection information acquired in the acquisition step;

a reconnection step of, after the connection between the portable terminal and the terminal inside home disconnects, making reconnection for the portable terminal to make the communication with the terminal inside home by using the connection information and the key information stored in the storage step; and an updated key acquisition step of acquiring, by the portable terminal, updated key information which is the key information updated by the terminal inside home after the connection for making the communication is established, wherein in the acquisition step, the portable terminal connects with the support server via a second network and acquires the connection information and key information via the support server, in a state in which the portable terminal is connected with the second network different from the first network, in the reconnection step of, after the connection of the portable terminal switches from the second network to the first network, making reconnection for the portable terminal to make the communication with the terminal inside home via the first network by using the connection information and the key information stored in the storage step, and in the reconnection step, after the connection of the portable terminal switches from one of the first network and the second network to a third network, the portable terminal makes the reconnection for making the communication with the terminal inside home via the third network by using the updated key information acquired in the updated key acquisition step in addition to the connection information stored in the storage step.

7. The connection method according to claim 6, wherein the third network is a network identical to one of the first network and the second network.

8. A connection system comprising:
a router inside home;
a terminal inside home; and
a portable terminal outside home, the connection system for making connection for the portable terminal to make communication with the terminal inside home on an equal footing,
the router inside home being connected to a network,
the terminal inside home being connected to the router inside home,
the portable terminal comprising:
an acquisition unit that acquires connection information and key information from a support server connected to the network, the connection information comprising an Internet protocol (IP) address and a port number which are set in the router inside home to correspond to the terminal inside home, the key information being issued by the terminal inside home;
a storage that stores the connection information and the key information acquired by the acquisition unit; and
a communicator that:
makes a first connection to make the communication with the terminal inside home by using the connection information acquired by the acquisition unit, and
when the connection between the portable terminal and the terminal inside home disconnects, makes a reconnection to make the communication with the terminal inside home by using the connection information and the key information stored in the storage,
wherein in an acquisition step, the portable terminal connects with the support server via a second network and acquires the connection information and key information via the support server, in a state in which the portable terminal is connected with the second network different from a first network,
wherein in a reconnection step, after the connection of the portable terminal switches from the second network to the first network, making reconnection for the portable terminal to make the communication with the terminal inside home via the first network by using the connection information and the key information stored in the storage step,
wherein in an updated key acquisition step, updated key information, which is the key information updated by the terminal inside home after the connection for making the communication is established, is acquired by the portable terminal, and
wherein in the reconnection step, after the connection of the portable terminal switches from one of the first network and the second network to a third network, the portable terminal makes the reconnection for making the communication with the terminal inside home via the third network by using the updated key information acquired in the updated key acquisition step in addition to the connection information stored in the storage step.

* * * * *